United States Patent
Shoemaker et al.

(10) Patent No.: US 11,225,880 B1
(45) Date of Patent: Jan. 18, 2022

(54) TURBINE SHROUD RING FOR A GAS TURBINE ENGINE HAVING A TIP CLEARANCE PROBE

(71) Applicants: Rolls-Royce Corporation, Indianapolis, IN (US); Rolls-Royce North American Technologies Inc., Indianapolid, IN (US)

(72) Inventors: Brian J. Shoemaker, Indianapolis, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1023 days.

(21) Appl. No.: 15/887,491

(22) Filed: Feb. 2, 2018

Related U.S. Application Data (60) Provisional application No. 62/461,886, filed on Feb. 22, 2017.

(51) Int. Cl.
*F01D 11/22* (2006.01)
*F01D 25/00* (2006.01)

(52) U.S. Cl.
CPC ............ *F01D 11/22* (2013.01); *F01D 25/005* (2013.01); *F05D 2220/32* (2013.01); *F05D 2240/55* (2013.01); *F05D 2300/6033* (2013.01)

(58) Field of Classification Search
CPC ........ F01D 11/22; F01D 25/005; F01D 11/14; F01D 11/20; F05D 2220/32; F05D 2240/55; F05D 2230/6033
See application file for complete search history.

(56) References Cited

U.S. PATENT DOCUMENTS

| | | | |
|---|---|---|---|
| 5,404,793 A | 4/1995 | Myers | |
| 5,988,975 A | 11/1999 | Pizzi | |
| 6,808,363 B2 | 10/2004 | Darkins et al. | |
| 6,932,566 B2 | 8/2005 | Suzumura et al. | |
| 6,935,836 B2 * | 8/2005 | Ress, Jr. ................. | F01D 11/16 415/173.2 |
| 6,997,673 B2 | 2/2006 | Morris et al. | |
| 7,033,138 B2 | 4/2006 | Tomita et al. | |
| 8,128,343 B2 | 3/2012 | Schiavo et al. | |
| 8,439,629 B2 | 5/2013 | Pietraszkiewicz et al. | |
| 8,579,580 B2 | 11/2013 | Albers et al. | |
| 8,596,962 B1 | 12/2013 | Liang | |
| 8,647,055 B2 | 2/2014 | Foster et al. | |
| 8,834,105 B2 | 9/2014 | Albers et al. | |
| 8,998,572 B2 | 4/2015 | Lutjen et al. | |
| 9,228,447 B2 | 1/2016 | McCaffrey | |
| 9,587,504 B2 | 3/2017 | McCaffrey et al. | |
| 9,938,846 B2 | 4/2018 | Freeman et al. | |
| 9,945,256 B2 | 4/2018 | Freeman et al. | |
| 2003/0053050 A1 | 3/2003 | Potyrailo et al. | |

(Continued)

FOREIGN PATENT DOCUMENTS

EP  709550 A1  5/1996

*Primary Examiner* — Richard A Edgar
*Assistant Examiner* — Aye S Htay
(74) *Attorney, Agent, or Firm* — Barnes & Thornburg LLP (57) ABSTRACT

A gas turbine engine assembly includes adjacent components and a probe assembly. The probe assembly is configured to measure a distance between the probe assembly and blades located radially inward of the adjacent components.

20 Claims, 3 Drawing Sheets

(56) References Cited

U.S. PATENT DOCUMENTS

| | | | |
|---|---|---|---|
| 2003/0185674 A1 | 10/2003 | Alford et al. | |
| 2004/0047725 A1 | 3/2004 | Tomita et al. | |
| 2005/0232752 A1 | 10/2005 | Meisels | |
| 2006/0140754 A1* | 6/2006 | Tanioka | F01D 17/02 415/173.1 |
| 2007/0020095 A1* | 1/2007 | Dierksmeier | F01D 11/22 415/173.1 |
| 2007/0025837 A1 | 2/2007 | Pezzetti et al. | |
| 2009/0053050 A1 | 2/2009 | Bruce et al. | |
| 2009/0092485 A1 | 4/2009 | Bridges, Jr. et al. | |
| 2009/0096174 A1 | 4/2009 | Spangler et al. | |
| 2010/0079136 A1* | 4/2010 | Phillips | F01D 21/003 324/207.16 |
| 2010/0313404 A1* | 12/2010 | Bates | F01D 11/22 29/402.01 |
| 2011/0044801 A1 | 2/2011 | Di Paola et al. | |
| 2011/0056055 A1 | 3/2011 | Gendraud et al. | |
| 2011/0232752 A1 | 9/2011 | Mataki et al. | |
| 2012/0301269 A1 | 11/2012 | Alvanos et al. | |
| 2013/0004306 A1 | 1/2013 | Albers et al. | |
| 2013/0136582 A1 | 5/2013 | Mizokami et al. | |
| 2013/0177411 A1 | 7/2013 | Weber et al. | |
| 2013/0266416 A1 | 10/2013 | Bergman et al. | |
| 2014/0030072 A1 | 1/2014 | Hillier et al. | |
| 2016/0053624 A1* | 2/2016 | McCaffrey | F01D 11/20 415/173.1 |
| 2016/0208635 A1 | 7/2016 | Vetters et al. | |
| 2016/0258311 A1 | 9/2016 | Varney et al. | |
| 2016/0312639 A1 | 10/2016 | Shapiro et al. | |
| 2016/0362992 A1 | 12/2016 | Roy Thill et al. | |
| 2017/0002676 A1 | 1/2017 | Sippel et al. | |
| 2018/0038238 A1* | 2/2018 | Ribarov | F01D 11/22 |
| 2019/0078869 A1* | 3/2019 | Warren | F01D 17/02 |

* cited by examiner

TURBINE SHROUD RING FOR A GAS TURBINE ENGINE HAVING A TIP CLEARANCE PROBE

CROSS REFERENCE TO RELATED APPLICATIONS

This application claims priority to and the benefit of U.S. Provisional Patent Application No. 62/461,886, filed 22 Feb. 2017, the disclosure of which is expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and ignited. Products of the combustion reaction in the combustor are directed into the turbine where work is extracted to drive the compressor and, sometimes, an output shaft, fan, or propeller. Left-over products of the combustion reaction are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. The blade tracks block gasses from passing over the blades without interaction with the blades.

Some blade tracks are formed by a number of blade track segments arranged circumferentially adjacent one another to form a hoop around the blades of the rotating wheel assemblies. An annular clearance gap may be formed between the tip of the blades and the blade track segments. A size of the clearance gap may be controlled to block gasses from passing between the blades and the blade track segments to increase the efficiency of the gas turbine engine.

SUMMARY

The present disclosure may comprise one or more of the following features and combinations thereof.

A turbine shroud for use in a gas turbine engine may include a first blade track segment, a second blade track segment, and a probe assembly. The first blade track segment may comprise ceramic matrix composite material and may be arranged around at least a portion of a central axis of the turbine shroud. The first blade track segment may have a radial inner surface that defines at least a portion of a primary gas flow path and a radial outer surface spaced apart radially from the radial inner surface. The first blade track segment may be formed to include a first probe-receiving aperture opening into a circumferential end of the first blade track segment and extending radially through the radial outer surface and the radial inner surface of the first blade track segment.

The second blade track segment may comprise ceramic matrix composite material and may be located adjacent to the first blade track segment. The second blade track segment may include a radial inner surface that defines at least a portion of the primary gas flow path and a radial outer surface. The second blade track segment may be formed to include a second probe-receiving aperture opening into a circumferential end of the second blade track segment and extending radially through the radial outer surface and the radial inner surface of the second blade track segment.

The probe assembly may extend into a probe-receiving passageway located between the first and second blade track segments and defined by the first probe-receiving aperture and second probe-receiving apertures. The probe assembly may be configured to measure a distance between an end of the probe assembly and tips of blades rotating in the primary gas flow path about the central axis relative to the first and second blade track segments.

In some embodiments, the turbine shroud may further include a metallic carrier arranged circumferentially around at least a portion of the central axis. The metallic carrier may be formed to include a tube-receiving passageway that extends radially through the metallic carrier. The probe assembly may be fixed to the metallic carrier and may extend through the tube-receiving passageway such that the probe assembly is free to move radially in the probe-receiving passageway relative to the first and second blade track segments.

In some embodiments, the probe assembly may include a probe and a locator tube having an inner end and an outer end. The probe may be coupled to the inner end of the locator tube and may extend into the probe-receiving passageway. The locator tube may include a tube body that extends through the tube-receiving passageway of the metallic carrier and a shoulder that extends away from the tube body near the outer end of the locator tube. The shoulder may be coupled to the metallic carrier.

In some embodiments, the first blade track segment may include a first side surface that extends radially between the radial outer surface and the radial inner surface of the first blade track segment and a second side surface circumferentially spaced apart from the first side surface. The first probe-receiving aperture may extend circumferentially into the first side surface toward the second side surface.

In some embodiments, the turbine shroud may further include a rod seal located circumferentially between the first blade track segment and the second blade track segment to block gasses from passing between the first and second blade track segments. The rod seal may include a forward seal and an aft seal axially spaced apart from the forward seal to locate the probe-receiving passageway between the forward seal and the aft seal.

In some embodiments, the first blade track segment may further include a radial intermediate surface located radially between the radial outer surface and the radial inner surface. The first blade track segment may be formed to define a counterbore that extends radially through the radial outer surface to the radial intermediate surface. The first probe-receiving aperture may open into the counterbore.

In some embodiments, the radial outer surface may be arcuate and the radial intermediate surface may be planar. In some embodiments, the probe assembly may be spaced apart from the radial intermediate surface.

According to another aspect of the present disclosure, a turbine shroud for use in a gas turbine engine may include a carrier, a first blade track segment, and a blade-tip probe assembly. The carrier may be arranged around at least a portion of a central axis of the turbine shroud. The carrier may be formed to define a tube-receiving passageway that extends radially through the carrier. The first blade track segment may include a runner that extends around at least a portion of the central axis and an attachment feature that extends radially outward from the runner. The runner may be formed to define a first probe-receiving aperture that extends radially through the runner. The blade-tip probe assembly may extend through the tube-receiving passageway of the carrier into the first probe-receiving aperture. The blade-tip probe assembly may be fixed to the carrier while being free to move radially in the first probe-receiving aperture relative to the first blade track segment.

In some embodiments, the blade-tip probe assembly may include a probe and a locator tube having an inner end and an outer end. The probe may be coupled to the inner end of the locator tube and may extend into the first probe-receiving aperture. The locator tube may include a tube body that extends through the tube-receiving passageway of the carrier and a shoulder that extends away from the tube body near the outer end of the locator tube. The shoulder may be coupled to the carrier.

In some embodiments, the attachment feature may include a radially extending hanger body and a hanger arm that extends axially away from the hanger body. The hanger arm may define a cutout that extends radially through the hanger arm and the locator tube may extend through the cutout.

In some embodiments, the turbine shroud may further include a second blade track segment located adjacent the first blade track segment. The second blade track segment may be formed to define a second probe-receiving aperture that cooperates with the first probe-receiving aperture to define a probe-receiving passageway. The probe may be located in the probe-receiving passageway.

In some embodiments, the turbine shroud may further include a rod seal located circumferentially between the first blade track segment and the second blade track segment. The rod seal may include a forward seal and an aft seal spaced apart axially from the forward seal to locate the probe-receiving passageway axially between the forward seal and the aft seal.

In some embodiments, the runner may be formed to define a counterbore that extends radially into the runner toward the central axis. The first probe-receiving aperture may open into the counterbore.

In some embodiments, the runner may include a radial outer surface, a radial inner surface spaced apart from the radial outer surface, and a radial intermediate surface. The counterbore may extend through the radial outer surface to the radial intermediate surface. The radial outer surface may be arcuate and the radial intermediate surface may be planar.

According to another aspect of the present disclosure, a method of providing a turbine shroud adapted for use in gas turbine engine may include a number of steps. The method may include providing a carrier, a blade track segment, and a blade-tip probe assembly, the carrier arranged at least partway around a central axis of the turbine shroud and formed to include a tube-receiving passageway, and the blade track segment formed to include a probe-receiving aperture that extends through the blade track segment, supporting the blade track segment on the carrier, inserting the blade-tip probe assembly through the tube-receiving passageway formed in the carrier, and coupling the blade-tip probe assembly to the carrier such that a portion of the blade-tip probe assembly is located in the probe-receiving aperture formed in the blade track segment and is free to move radially in the probe-receiving aperture relative to the blade track segment.

In some embodiments, the blade track segment may include a radial inner surface that defines a portion of a gas flow path, a radial outer surface spaced apart from the radial inner surface, and a radial intermediate surface located radially between the radial inner surface and the radial outer surface. The blade track segment may be formed to define a counterbore that extends through the radial outer surface to the radial intermediate surface. The probe-receiving aperture may open into the counterbore. In some embodiments, the radial intermediate surface may be planar.

In some embodiments, the carrier may include a radial outwardly-facing support surface. The method may further include measuring a distance between the radial outwardly-facing support surface of the carrier and the radial intermediate surface of the blade track segment to provide a clearance measurement and positioning shims between the radial outwardly-facing support surface of the carrier and the blade-tip probe assembly based at least in part on the clearance measurement.

In some embodiments, the blade track segment may include a runner formed to include the probe-receiving aperture and a hanger that may be supported on the carrier. The method may further include inserting the blade-tip probe assembly through a portion of the hanger.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments shown in the drawings and specific language will be used to describe the same.

Figure 1:
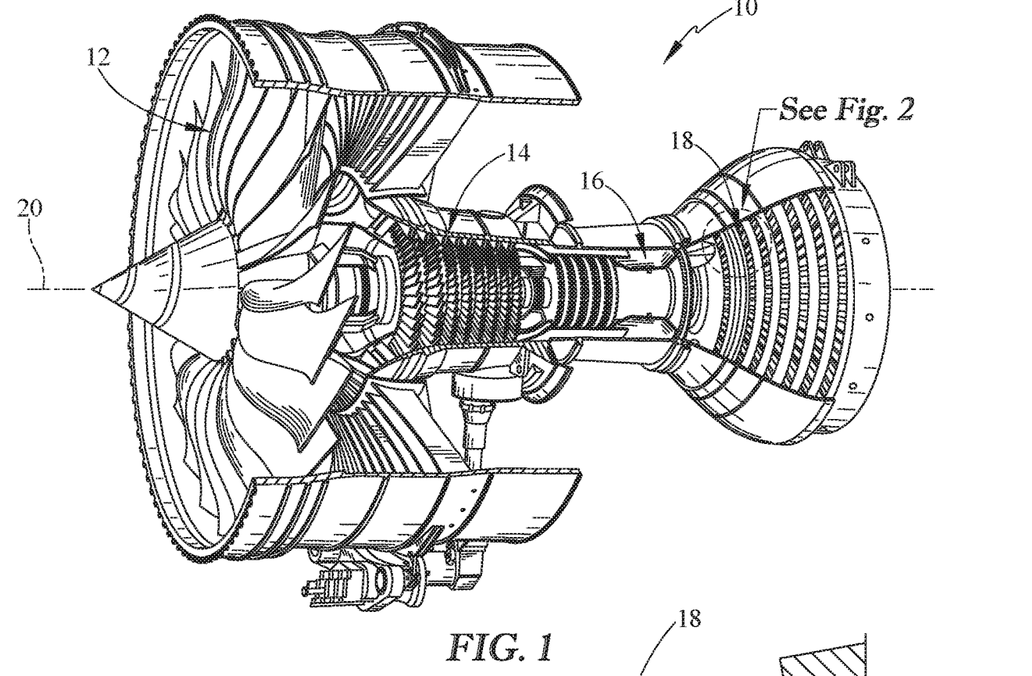
FIG. 1 is cutaway view of a gas turbine engine assembly including a fan, a compressor, a combustor, and a turbine showing that the turbine includes a rotating wheel assemblies in a turbine case.

An illustrative gas turbine engine 10 includes a fan 12, a compressor 14, a combustor 16, and a turbine 18 as shown in FIG. 1. The turbine 18 is configured to power the gas turbine engine 10 and includes at least one turbine wheel assembly 22 having a plurality of blades 23 and a turbine shroud 24 arranged around the turbine wheel assembly 22 as shown in FIGS. 1 and 2.

Figure 2:
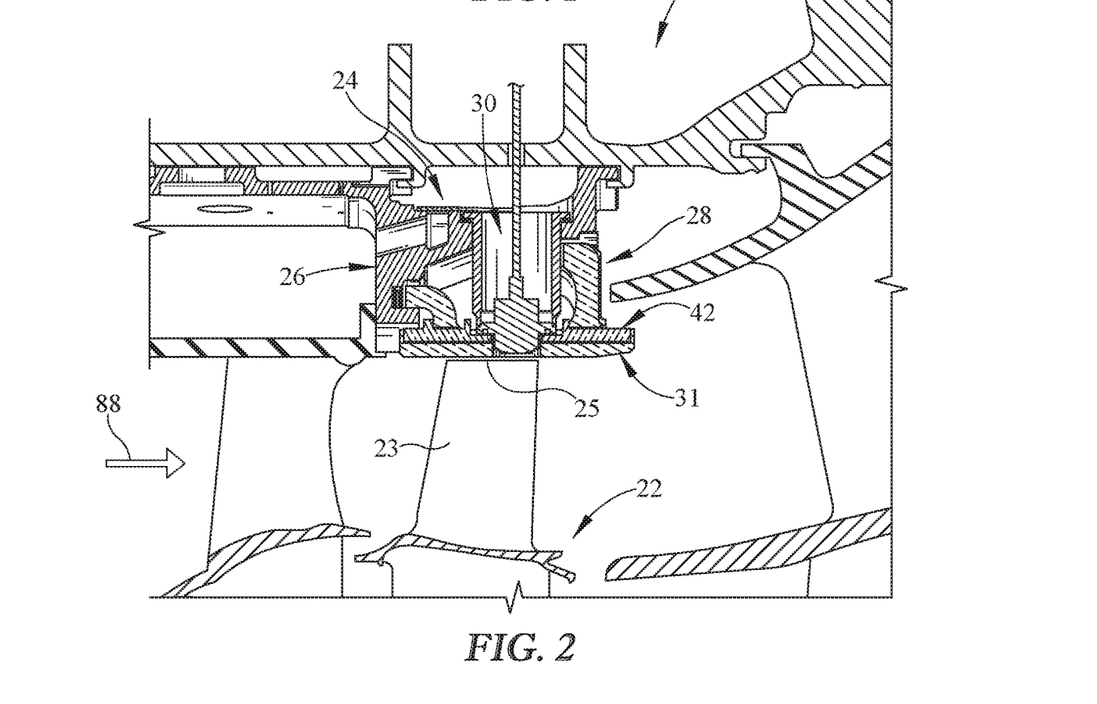
FIG. 2 is a cross sectional view of a portion of the turbine included in the gas turbine engine of FIG. 1 showing that the turbine includes a turbine shroud, and further showing that the turbine shroud includes a probe assembly that extends through a carrier and a blade track of the turbine shroud to measure a distance between the blade track and tips of blades included in the rotating wheel assembly.
Figure 4:
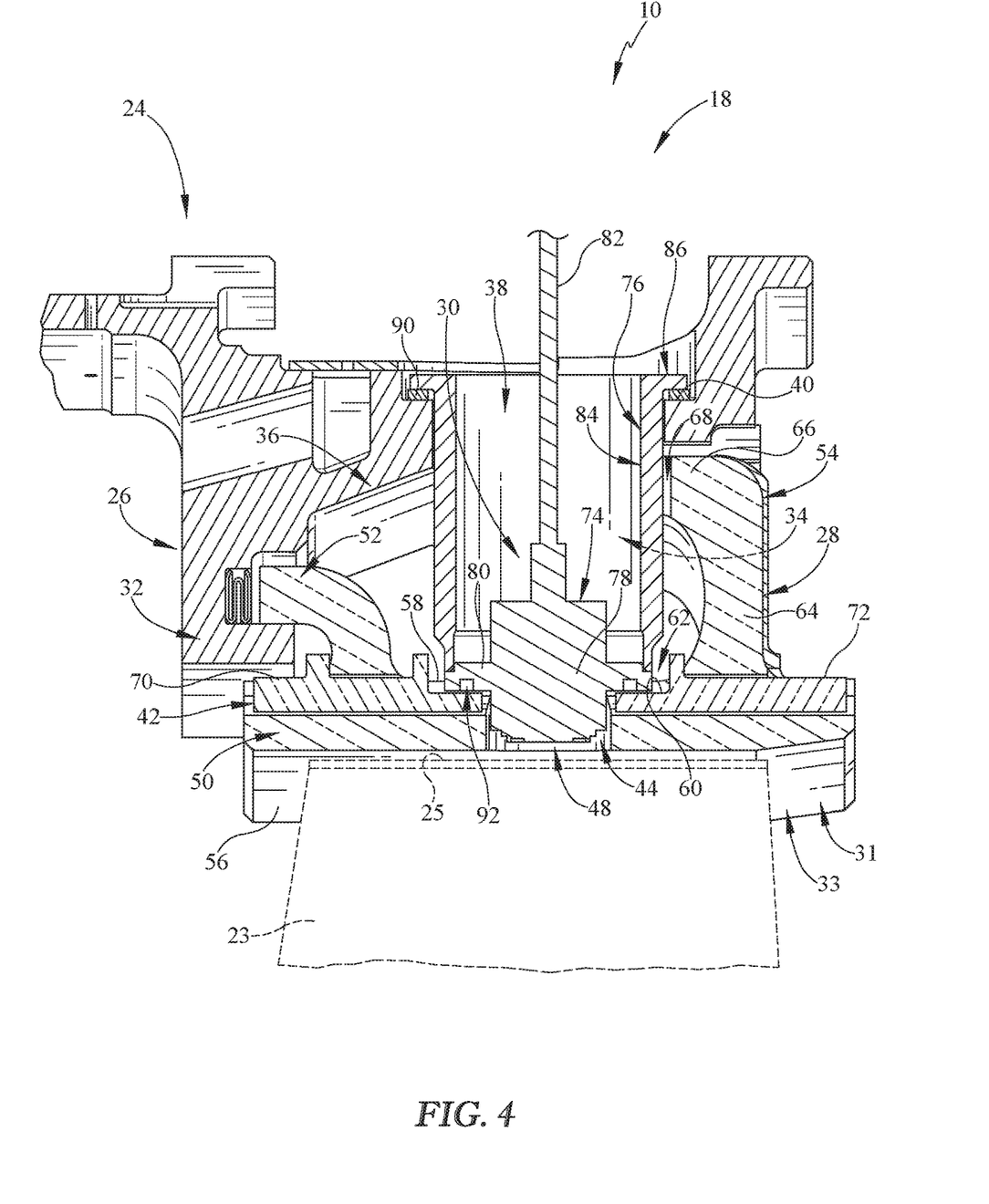
FIG. 4 is a detail cross sectional view of the turbine shroud shown in FIG. 2 illustrating that the probe assembly is fixed to the carrier and extends into a probe-receiving aperture formed in the blade track segment, and further suggesting that the probe assembly is free to move radially in the probe-receiving aperture relative to the blade track segments.

The turbine shroud 24 includes a carrier 26, a blade track 28, and a blade-tip probe assembly 30 as shown in FIG. 2. The carrier 26 is configured to support the blade track 28 in position adjacent the blades 23 of the turbine wheel assembly 22 as shown in FIG. 4. The blade track 28 blocks combustion products from passing over the blades 23 and insulates the carrier 26 from the hot combustion products. The blade-tip probe assembly 30 is configured to measure a distance between the blade-tip probe assembly 30 and tips 25 of the blades 23 for determining a clearance gap between the blade track 28 and the blade tips 25. The blade-tip probe assembly 30 is fixed to the carrier 26 and free to move relative to the blade track 28.

The blade track 28 illustratively includes a plurality of blade track segments 31 that comprise ceramic matrix composite material. The blade track segments 31 cooperate to form a hoop around the turbine wheel assembly 22 that blocks combustion products from passing over turbine blades 23.

The blade-tip probe assembly 30 includes a probe 74 located in a probe-receiving passageway 48 that extends between adjacent blade track segments 33, 35 as shown in FIGS. 2 and 4. The probe-receiving passageway 48 opens into circumferential ends of the blade track segments 33, 35 to minimize stresses in the blade track segments 33, 35 caused by thermal growth of engine components during use of the turbine shroud 24.

Turning back to the overall gas turbine engine 10 of FIG. 1, the engine 10 includes the fan 12, the compressor 14, the combustor 16, and the turbine 18. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 20 of the gas turbine engine 10 and drive the compressor 14 and the fan 12. The turbine 18 includes the turbine wheel assembly 22 and the turbine shroud 24 as shown in FIG. 2. The illustrative turbine shroud 24 includes the carrier 26, the blade track 28, and the blade-tip probe assembly 30 as shown in FIG. 2.

The illustrative carrier 26 comprises metallic materials and the carrier 26 extends about the central axis 20 and is configured to support the blade track 28 around the blades 23 included in the turbine wheel assembly 22 as shown in FIG. 2. In the illustrative embodiment, the carrier 26 includes a forward bracket 32, an aft bracket 34 axially spaced apart from the forward bracket 32, and a web 36 that extends between and interconnects the forward bracket 32 and the aft bracket 34.

The forward and aft brackets 32, 34 extend radially inward toward the central axis 20 and support forward and aft hangers 52, 54 included in the blade track segments 31 as shown in FIG. 4. In the illustrative embodiment, each of the forward and aft brackets 32, 34 is formed to include a birdmouth that receives the forward and aft hangers 52, 54.

The web 36 is formed to include a tube-receiving passageway 38 that extends radially through the web 36 to allow access to the blade track 28 as shown in FIGS. 2 and 4. The tube-receiving passageway 38 receives the probe assembly 30 and locates the probe assembly 30 relative to the blade track 28. In some embodiments, the tube-receiving passageway 38 extends through the aft bracket 34.

The web 36 includes a radial outwardly-facing support surface 40 arranged around the tube-receiving passageway 38 as shown in FIG. 4. The support surface 40 supports the probe assembly 30 and locates the probe assembly 30 axially and radially relative to the central axis 20. Illustratively, the web 36 is arcuate and extends around the central axis 20 while the support surface 40 is machined to be planar to provide a flat datum surface. Illustratively, the carrier 26 further includes shims 90 located between the probe assembly 30 and the support surface 40 of the web 36. The shims 90 are sized to locate the probe 74 of the probe assembly 30 radially relative to the blade track 28.

The blade track 28 is generally concentric with and nests into the carrier 26 around the central axis 20 of the gas turbine engine 10 as suggested in FIGS. 2 and 4. The illustrative blade track 28 is formed from a plurality of blade track segments 31 which cooperate to form the hoop shaped blade track 28 and a plurality of rod seals 42 located between adjacent blade track segments 31 as suggested in FIGS. 2 and 3.

Each blade track segment 31 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the blade track segments 31 may be made of other metallic, non-metallic, or composite materials with low coefficients of thermal expansion.

Figure 3:
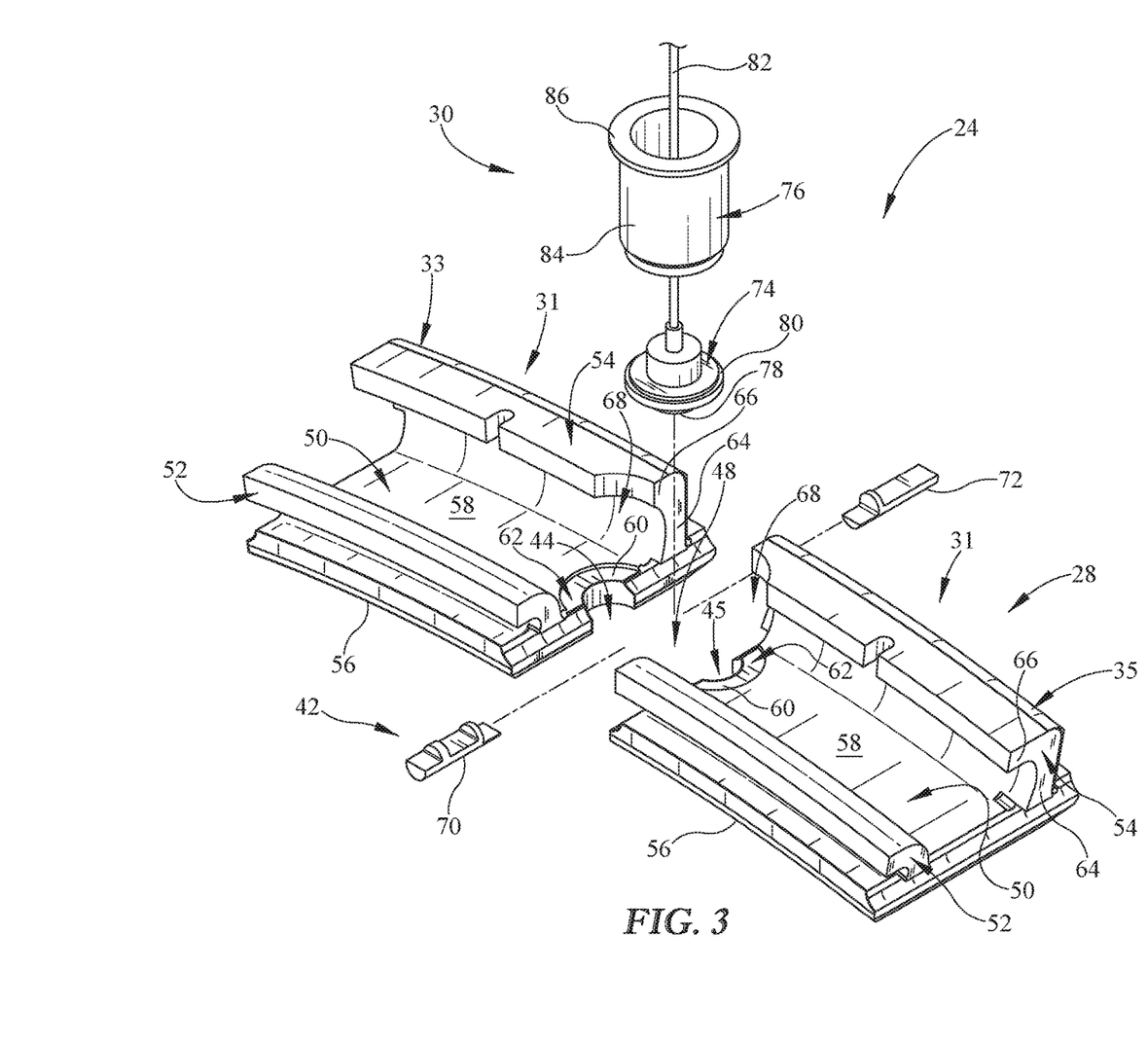
FIG. 3 is an exploded perspective view of the turbine shroud of FIG. 2 showing that the blade track includes a plurality of blade track segments and rod seals and suggesting that the probe assembly and a rod seal are located between at least one pair of adjacent blade track segments.

In illustrative embodiments, the blade track 28 includes at least a first blade track segment 33 and a second blade track segment 35 located adjacent the first blade track segment 33 as suggested in FIG. 3. The first and second blade track segments 33, 35 are formed with apertures 44, 45 at their circumferential ends that cooperate to define a probe-receiving passageway 48. The probe assembly 30 extends into the probe-receiving passageway 48 and is configured to measure a distance between an end of the probe assembly 30 and tips 25 of the blades 23 rotating in the primary gas flow path 88 about the central axis 20 relative to the first and second blade track segments 33, 35.

In other embodiments, the aperture 44 formed in the blade track segment 33 is spaced apart from the circumferential end of the blade track segment 33. The aperture 44 may be formed in the end of only one segment. As a result, the probe assembly 30 may extend into a single blade track segment without extending into an adjacent blade track segment.

Each blade track segment 31 includes a runner 50, a forward attachment feature 52, and an aft attachment feature 54 as shown in FIG. 3. Illustratively, the forward attachment feature 52 comprises the forward hanger 52 and the aft attachment feature 54 comprises the aft hanger 54 as shown in FIG. 3. The runner 50 is configured to block hot gasses from passing over the blades 23 as suggested in FIG. 4.

The runner 50 includes a radial inner surface 56 and a radial outer surface 58 as shown in FIGS. 3 and 4. The radial inner surface 56 defines a portion of a primary flow path 88. The radial outer surface 58 is radially spaced apart from the radial inner surface 56 to locate the radial inner surface 56 between the central axis 20 and the radial outer surface 58. In some embodiments, the radial inner surface 56 and the radial outer surface 58 are non-linear and curved. Illustratively, the radial inner surface 56 and the radial outer surface 58 are arcuate.

At least one runner 50 is formed to include a probe-receiving aperture 44 that extends through the radial inner surface 56 and the radial outer surface 58 as shown in FIGS. 2-3. Illustratively, the probe-receiving aperture 44 opens into the primary flow path 88. In the illustrative embodiment, the blade track segments 33, 35 are formed to include probe-receiving apertures 44, 45 that open into a circumferential ends of the runners 50 and cooperate to define the probe-receiving passageway 48 as shown in FIG. 2. Illustratively, the probe-receiving apertures 44, 45 are located axially about midway along a length of the runners 50. In other embodiments, the apertures 44, 45 may be located in axially forward or aft locations in the runner 50.

Illustratively, the runner 50 further includes a radial intermediate surface 60 as shown in FIG. 3. The radial intermediate surface 60 is located radially between the radial inner surface 56 and the radial outer surface 58. The radial intermediate surface is planar and may be used as a reference plane to locate the probe assembly 30. The runner 50 is formed to define a counterbore 62 that extends through the radial outer surface 58 to the radial intermediate surface 60.

The counterbore 62 is aligned with the probe-receiving aperture 44 such that the probe-receiving aperture 44 opens into the counterbore 62. In the illustrative embodiment, the blade track segments 33, 35 are each formed to include counterbores 62 and the probe-receiving passageway 48 opens into the counterbores 62.

The aft hanger 54 includes a hanger body 64 that extends radially outward away from the runner 50 and a hanger arm 66 as shown in FIG. 3. The hanger arm 66 extends axially away from the hanger body 64 and is supported by the aft bracket 34 included in the carrier 26. The illustrative aft hanger arm 66 defines a cutout 68 that extends radially through the aft hanger arm 66 to receive a portion of a locator tube 76 included in the probe assembly 30 as suggested in FIG. 3. The forward hanger 52 is substantially similar to the aft hanger 54. However, the illustrative forward hanger 52 is not formed to define a cutout.

The rod seals 42 are located between adjacent blade track segments 31 to block gasses from passing between the blade track segments 31. The rod seals 42 extend along a length of the blade track segments 31 in an axial direction. At least one rod seal 42 is located circumferentially between the first blade track segment 33 and the second blade track segment 35 and includes a forward seal 70 and an aft seal 72 as shown in FIGS. 3 and 4. The aft seal 72 is axially spaced apart from the forward seal 70 to locate the probe-receiving passageway 48 between the forward seal 70 and the aft seal 72. In other embodiments, adjacent blade track segments 31 are sealed with other suitable sealing methods such as, for example, by using strip seals.

The blade-tip probe assembly 30 is fixed to the carrier 26 and free to move radially in the probe-receiving passageway 48 relative to the blade track segment 31 as suggested in FIG. 4. The blade-tip probe assembly 30 includes the probe 74 and the locator tube 76 as shown in FIGS. 3 and 4. The probe 74 comprises a tip clearance control probe 74 configured to measure a distance between the probe 74 and tips 25 of the blades 23 as they rotate about the central axis 20. The locator tube 76 is coupled to the probe 74 and fixed to the carrier 26 so as to locate the probe 74 relative to the blade track segments 31.

The illustrative probe 74 includes a sensor head 78, an attachment flange 80, and a cord 82 as shown in FIG. 4. The sensor head 78 is located in the probe-receiving passageway 48 to measure a distance to the blade tips 25. The attachment flange 80 extends around the sensor head 78 and is coupled to the locator tube 76. The cord 82 is coupled to the sensor head 78 and extends through the locator tube 76 to provide measurement data to a controller and/or a computer.

The attachment flange 80 is located adjacent the radial intermediate surface 60 as shown in FIG. 4. The illustrative attachment flange 80 is formed to define a seal channel 92. A seal may be located in the seal channel 92 to provide a seal between the probe 74 and the runner 50. In other embodiments, the attachment flange 80 is formed to define a knife seal that cooperates with the radial intermediate surface 60 to provide a seal between the probe 74 and the runner 50.

The locator tube 76 is made of materials selected to control and/or minimize relative thermal growth between the locator tube 76 and the carrier 26. Minimizing relative thermal growth can be desired so that the locator tube 76 does not push the probe 74 radially inward which may cause the probe assembly 30 to apply an undesirable force to blade track segment 31 which may damage the blade track segment 31.

The locator tube 76 has an inner end and an outer end and the locator tube 76 includes a tube body 84 and a shoulder 86 that extends away from the tube body 84 near the outer end as shown in FIG. 4. The tube body 84 extends through the tube-receiving passageway 38 and is coupled to the probe 74 to locate the probe 74 in the probe-receiving passageway 48. The shoulder 86 is fixed to the carrier 26 to couple the probe assembly 30 to the carrier 26. The tube body 84 is hollow and extends radially relative to the central axis 20. Illustratively, the tube body 84 is tapered near the probe 74.

The shoulder 86 extends away from an end of the tube body 84 as shown in FIG. 4. The shoulder 86 is supported by the support surface 40 included in the carrier 26. A radial distance between the support surface 40 of the carrier 26 and the radial intermediate surface 60 of the runner may be measured to provide a clearance measurement. Shims 90 may be located between the shoulder 86 and the support surface 40 based on the clearance measurement. The shims 90 and the locator tube 76 cooperate to locate the probe 74 near the radial intermediate surface 60 so as to minimize leakage of gasses between the probe 74 and the runner 50 while providing a gap between the probe 74 and the runner 50 to allow the runner 50 to move relative to the runner 50 due to thermal growth of the turbine shroud components.

A method of providing the turbine shroud 24 may include providing the carrier 26, the blade track segment 31, and the blade-tip probe assembly 30. The carrier 26 is arranged at least partway around the central axis 20 of the turbine shroud 24 and is formed to include the tube-receiving passageway 38. The blade track segment 31 is formed to include the probe-receiving aperture 44 that extends through the blade track segment 31. The blade track segment 31 is supported on the carrier 26. The blade-tip probe assembly 30 is inserted through the tube-receiving passageway 38 formed in the carrier 26. The blade-tip probe assembly 30 is coupled to the carrier 26 such that a portion of the blade-tip probe assembly 30 is located in the probe-receiving aperture 44 and is free to move radially in the probe-receiving aperture 44 relative to the blade track segment 31.

In some embodiments, the method comprises measuring a distance between the radial outwardly-facing support surface 40 of the carrier 26 and the radial intermediate surface 60 of the blade track segment 31 to provide the clearance measurement and positioning shims 90 between the radial outwardly-facing support surface 40 of the carrier 26 and the blade-tip probe assembly 30 based at least in part on the clearance measurement. In some embodiments, the method includes inserting the blade-tip probe assembly 30 through a portion of the hanger 54.

Typical gas turbine engines include alternating stages of static vanes and rotating blades in the compressor and the turbine. The rotating blades may impart mechanical energy to flowpath gases in the compressor and they may extract mechanical energy from the flowpath gases in the turbine.

In both the compressor and turbine, the blades may be fitted to a rotating disc or drum. The tips of the blades move past static blade track segments (also called seal segments or shrouds) which are positioned just radially outboard of the rotating blades as shown in FIG. 4. The clearance between the blade tips and the blade track segments may have an impact on the aerodynamic efficiency of the turbine. It may be desired to minimize the clearance between blade tips and blade track segments to increase efficiency of the turbine.

In order to more accurately calculate the turbine efficiency, it may be desired to measure a gap between the blade track segments and the blade tips throughout an operating range of the engine. In some embodiments, this may be accomplished by measuring the tip clearance with a Tip Clearance Control (TCC) probe.

In illustrative embodiments, the probe is mounted to the seal segment carrier and the probe is free to move relative to the blade track segment as suggested in FIG. 4. Illustratively, the probe design includes a probe attached to attach a probe tube and the probe tube is fixed to the carrier. The material for the probe tube may be selected to minimize differential growth between the probe tube and the ceramic matrix composite blade track segments.

The present disclosure may avoid issues with bonding the probe to the blade track segment. If the probe tube were to radially outgrow the seal segment, significant load could be imparted to the blade track segment which could lead to failure. If the blade track segment were to radially outgrow the probe tube, a gap may open between the probe and the blade track segment which could lead to increased leakage and could also cause errors in the tip clearance measurement. In the present disclosure, leakage between the blade segment and probe is managed by a controlled gap between these two components.

Illustratively, the growths are matched such that there may be negligible growth difference between these two components, which causes the probe to maintain a position relative to the flowpath surface of the seal segment. As a result, an accurate measurement of tip clearance may be provided.

To ensure the probe is properly located, the tolerance stack-up may be accounted for. To overcome any dimensional stack variation within the assembly, shims may be placed between the probe tube and the carrier. The thickness of the shim may be calculated based on drop dimensions from the surface the shim sits on to the sealing surface on the blade track segment. The appropriate thickness shim may be selected to ensure correct positioning of the probe relative to the sealing surface.

Due to the surface roughness of the base ceramic matrix composite material and the curvature of the back side of the blade track interfacing with a planar probe surface, the blade track is formed to minimize tolerances and allow for sealing. Illustratively, the sealing surface is machined for tolerances and to allow for sealing.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for use in a gas turbine engine, the turbine shroud comprising
   a first blade track segment comprising ceramic matrix composite material and arranged around at least a portion of a central axis, the first blade track segment having a radial inner surface that defines at least a portion of a primary gas flow path and a radial outer surface spaced apart radially from the radial inner surface, and the first blade track segment formed to include a first probe-receiving aperture opening into a circumferential end of the first blade track segment and extending radially through the radial outer surface and the radial inner surface of the first blade track segment,
   a second blade track segment comprising ceramic matrix composite material located adjacent to the first blade track segment, the second blade track segment including a radial inner surface that defines at least a portion of the primary gas flow path and a radial outer surface, the second blade track segment formed to include a second probe-receiving aperture opening into a circumferential end of the second blade track segment and extending radially through the radial outer surface and the radial inner surface of the second blade track segment, and
   a probe assembly that extends into a probe-receiving passageway located between the first and second blade track segments and defined by the first probe-receiving aperture and second probe-receiving aperture, wherein the probe assembly is configured to measure a distance between an end of the probe assembly and tips of blades rotating in the primary gas flow path about the central axis relative to the first and second blade track segments.

2. The turbine shroud of claim 1, further comprising a metallic carrier arranged circumferentially around at least a portion of the central axis, the metallic carrier is formed to include a tube-receiving passageway that extends radially through the metallic carrier, and the probe assembly is fixed to the metallic carrier and extends through the tube-receiving passageway such that the probe assembly is free to move radially in the probe-receiving passageway relative to the first and second blade track segments.

3. The turbine shroud of claim 2, wherein the probe assembly includes a probe and a locator tube having an inner end and an outer end, the probe is coupled to the inner end of the locator tube and extends into the probe-receiving passageway, the locator tube includes a tube body that extends through the tube-receiving passageway of the metallic carrier and a shoulder that extends away from the tube body near the outer end of the locator tube, and the shoulder is coupled to the metallic carrier.

4. The turbine shroud of claim 2, wherein the first blade track segment includes a first side surface that extends radially between the radial outer surface and the radial inner surface of the first blade track segment and a second side surface circumferentially spaced apart from the first side surface and the first probe-receiving aperture extends circumferentially into the first side surface toward the second side surface.

5. The turbine shroud of claim 1, further comprising a rod seal located circumferentially between the first blade track segment and the second blade track segment to block gasses from passing between the first and second blade track segments and the rod seal includes a forward seal and an aft seal axially spaced apart from the forward seal to locate the probe-receiving passageway between the forward seal and the aft seal.

6. The turbine shroud of claim 1, wherein the first blade track segment further includes a radial intermediate surface located radially between the radial outer surface and the radial inner surface, the first blade track segment is formed to define a counterbore that extends radially through the radial outer surface to the radial intermediate surface, and the first probe-receiving aperture opens into the counterbore.

7. The turbine shroud of claim 6, wherein the radial outer surface is arcuate and the radial intermediate surface is planar.

8. The turbine shroud of claim 6, wherein the probe assembly is spaced apart from the radial intermediate surface.

9. A turbine shroud for use in a gas turbine engine, the turbine shroud comprising
a carrier arranged around at least a portion of a central axis of the turbine shroud and the carrier formed to define a tube-receiving passageway that extends radially through the carrier,
a first blade track segment that includes a runner that extends around at least a portion of the central axis and an attachment feature that extends radially outward from the runner and the runner formed to define a first probe-receiving aperture that extends radially through the runner, and
a blade-tip probe assembly that extends through the tube-receiving passageway of the carrier into the first probe-receiving aperture and wherein the blade-tip probe assembly is fixed to the carrier while free to move radially in the first probe-receiving aperture relative to the first blade track segment.

10. The turbine shroud of claim 9, wherein the blade-tip probe assembly includes a probe and a locator tube having an inner end and an outer end, the probe is coupled to the inner end of the locator tube and extends into the first probe-receiving aperture, the locator tube includes a tube body that extends through the tube-receiving passageway of the carrier and a shoulder that extends away from the tube body near the outer end of the locator tube, and the shoulder is coupled to the carrier.

11. The turbine shroud of claim 10, wherein the attachment feature comprises a radially extending hanger body and a hanger arm that extends axially away from the hanger body, the hanger arm defines a cutout that extends radially through the hanger arm, and the locator tube extends through the cutout.

12. The turbine shroud of claim 10, further comprising a second blade track segment located adjacent the first blade track segment, the second blade track segment formed to define a second probe-receiving aperture that cooperates with the first probe-receiving aperture to define a probe-receiving passageway, and the probe is located in the probe-receiving passageway.

13. The turbine shroud of claim 12, further comprising a rod seal located circumferentially between the first blade track segment and the second blade track segment and the rod seal includes a forward seal and an aft seal spaced apart axially from the forward seal to locate the probe-receiving passageway axially between the forward seal and the aft seal.

14. The turbine shroud of claim 9, wherein the runner is formed to define a counterbore that extends radially into the runner toward the central axis and the first probe-receiving aperture opens into the counterbore.

15. The turbine shroud of claim 14, wherein the runner includes a radial outer surface, a radial inner surface spaced apart from the radial outer surface, and a radial intermediate surface, the counterbore extends through the radial outer surface to the radial intermediate surface, the radial outer surface is arcuate, and the radial intermediate surface is planar.

16. A method of providing a turbine shroud adapted for use in gas turbine engine, the method comprising,
providing a carrier, a blade track segment, and a blade-tip probe assembly, the carrier arranged at least partway around a central axis of the turbine shroud and formed to include a tube-receiving passageway, and the blade track segment formed to include a probe-receiving aperture that extends through the blade track segment,
supporting the blade track segment on the carrier,
inserting the blade-tip probe assembly through the tube-receiving passageway formed in the carrier, and
coupling the blade-tip probe assembly to the carrier such that a portion of the blade-tip probe assembly is located in the probe-receiving aperture formed in the blade track segment and is free to move radially in the probe-receiving aperture relative to the blade track segment.

17. The method of claim 16, wherein the blade track segment includes a radial inner surface that defines a portion of a gas flow path, a radial outer surface spaced apart from the radial inner surface, and a radial intermediate surface located radially between the radial inner surface and the radial outer surface, the blade track segment is formed to define a counterbore that extends through the radial outer surface to the radial intermediate surface, and the probe-receiving aperture opens into the counterbore.

18. The method of claim 17, wherein the radial intermediate surface is planar.

19. The method of claim 18, wherein the carrier includes a radial outwardly-facing support surface and the method further comprises measuring a distance between the radial outwardly-facing support surface of the carrier and the radial intermediate surface of the blade track segment to provide a clearance measurement and positioning shims between the radial outwardly-facing support surface of the carrier and the blade-tip probe assembly based at least in part on the clearance measurement.

20. The method of claim 16, wherein the blade track segment includes a runner formed to include the probe-receiving aperture and a hanger that is supported on the carrier and the method further includes inserting the blade-tip probe assembly through a portion of the hanger.

* * * * *